(12) United States Patent
James et al.

(10) Patent No.: US 6,683,568 B1
(45) Date of Patent: Jan. 27, 2004

(54) POSITION ESTIMATION SERVICES

(75) Inventors: Paul William James, Auckland (NZ); Enrico Haemmerle, Albany (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 10/009,545

(22) PCT Filed: May 15, 2000

(86) PCT No.: PCT/NZ00/00076

§ 371 (c)(1),
(2), (4) Date: May 6, 2002

(87) PCT Pub. No.: WO00/70365

PCT Pub. Date: Nov. 23, 2000

(30) Foreign Application Priority Data

May 14, 1999 (NZ) .................................................. 335787

(51) Int. Cl.[7] .............................. G01S 1/24; G01S 3/02
(52) U.S. Cl. ........................ 342/387; 342/457; 342/465
(58) Field of Search ................................. 342/465, 387, 342/457, 463, 464

(56) References Cited

U.S. PATENT DOCUMENTS

| | | | | | |
|---|---|---|---|---|---|
| 5,119,104 | A | * | 6/1992 | Heller | 342/450 |
| 5,534,876 | A | * | 7/1996 | Erickson et al. | 342/387 |
| 5,742,635 | A | * | 4/1998 | Sanderford, Jr. | 375/149 |
| 6,121,926 | A | * | 9/2000 | Belcher et al. | 342/450 |
| 6,414,634 | B1 | * | 7/2002 | Tekinay | 342/453 |

* cited by examiner

Primary Examiner—Gregory C. Issing
(74) Attorney, Agent, or Firm—Barry R. Lipsitz; Douglas M. McAllister

(57) ABSTRACT

A system and method for estimating the position of an object within a volume. The system uses the time difference of arrival of signals at a plurality of receivers to establish the position of an object, using only the substantially multipath free portion of the received signal for analysis purposes. A prior model of the object and/or volume is used to assist the location determination process.

58 Claims, 8 Drawing Sheets

POSITION ESTIMATION SERVICES

This application claims the benefit of international application number PCT/NZ00/00076 filed May 15, 2000. The international application was published under PCT Article 21(2) in the English language.

TECHNICAL FIELD

This invention relates to a method and apparatus for a position estimation system and in particular, but not exclusively to a method and apparatus for an indoor position estimation system utilising the multipath-free component of signals received from an object.

BACKGROUND

There are a number of systems available which are used to identify the position of an object or track the movements of an object. These systems may be divided into indoor and outdoor systems.

In outdoor position estimation systems, probably the most widespread is the NAVSTAR Global Positioning System (GPS). This system operates by providing a plurality of satellites transmitting reference signals from which the GPS receiver must calculate its position. This requires the device to include relatively expensive timing and calculating devices which add to the size and expense of the device. Furthermore, the magnitude of error permissible in outdoor systems is typically much greater than the requirements for an indoor system. Although the accuracy of outdoor systems may be increased using methods such as relative and differential GPS, this adds additional expense and space requirements to the system. Other outdoor position determination techniques include LORAN and radar systems. However, these also require the use of relatively expensive and bulky equipment.

In indoor applications, control over the magnitude of errors must typically be much more stringent due in part to the reduced total area in which a product may be located and the high number of objects which may be located in any particular area. Also, the smaller size of the objects result in limitations in the power of signals which may be transmitted from the object, causing systems relying on such transmissions susceptible to errors due to noise.

One known method for determining the position of a object is to detect the time of arrival of signals transmitted by a transmitter located on the object or estimating the round trip time of a signal from a polling base station to the object and back again, see U.S. Pat. No. 5,526,357. The position of the object is then determined by spatial calculations.

A problem in wireless systems is the occurrence of interfering signals. These interfering signals typically originate from a number of sources including background noise, separate transmission sources and multipath effects. Background noise and separate transmission sources are often unavoidable, but can be filtered out or accommodated in system design in some circumstances. Interference due to multipath effects can be more problematic, especially where the timing and/or phase information contained in the signal is important.

OBJECT OF THE INVENTION

It is an object of the present invention to overcome or at least alleviate problems in methods and apparatus for tracking systems at present, or at least to provide the public with a useful choice.

SUMMARY OF THE INVENTION

According to one aspect of the present invention, there is provided position estimation system for locating an object in a given volume, the system including:

a signal transmitter suitable for use with the object, the signal transmitter adapted to transmit an identifiable signal;

a plurality of receivers suitable for receiving signals from the signal transmitter, the receivers positioned at predetermined or determinable positions in relation to the given volume;

signal detector adapted to determine the difference in the time of arrival of the signal between at least two receivers; and computation means to compute the position of the object in the given volume from said difference in the time of arrival;

wherein the difference in the time of arrival of the signal is determined by comparing the arrival time of substantially corresponding trigger portions, said trigger portions being at least a portion of the substantially multipath free component of the signal as received at each receiver.

Preferably, the system includes computation means adapted to determine a best fit model to the trigger portion of each received signal, and compute the time difference of arrival from the time delay between the best fit models.

Preferably, the tracking system further includes a storage means adapted to store a predetermined model of the object and/or given volume, the computation means adapted to determine a pre-estimate of the onset time of the first multipath component from the predetermined model.

According to another aspect of the present invention, there is provided a method of tracking an object in a given volume, the method including:

transmitting an identifiable signal from the object to be tracked;

receiving the transmitted signal at a plurality of receivers positioned at predetermined or determinable positions;

computing the difference in the time of arrival of the signal between at least one pair of receivers based on the arrival time of at least a portion of the substantially multipath free component of the signal as received at each receiver; and computing the position of the object in the given volume from said difference in the time of arrival.

Preferably, the method further includes computing a best fit model to the substantially multipath free component of the signal, wherein the time difference of arrival of the received signals is determined by the time delay between the best fit models.

Preferably, the method further includes the step of determining a pre-estimate of the onset time of the first multipath signal from a predetermined model of the object and/or the given volume.

Further aspects of the present invention may become apparent from the following description, which is given by way of example and in which reference is made to the accompanying drawings.

DETAILED DESCRIPTION OF PREFERRED EMBODIMENTS

The present invention provides a method and apparatus for position determination and/or tracking of an object in a given volume. The method and apparatus are particularly suited to indoor applications, for example in a factory in which objects need to be located. Although the following description is given specifically in relation to the use of the method and apparatus in a factory environment, it will be appreciated by those skilled in the art that the present invention may find application in any indoor environment and may be extended to outdoor environments if required.

A common method of position determination involves transmitting a signal from an object to be tracked and detecting that signal at two or more receivers. The time difference of arrival of the signal at each receiver can then be used to determine the position of the object in relation to the receivers. If the position of the receivers are known, or at least are determinable, then subsequently the location of the object is known or more specifically, the location of the transmitter on the object is known. The present invention uses the time difference of arrival of substantially corresponding portions of the received signal at pairs of receivers. However, only the substantially multipath free component of the signal is used, thereby avoiding the interfering and often error creating multipath signals from the determination of position. This multipath free component is the initial portion of the received signal.

In order to allow multiple measurements of position of one or more objects, it is thus necessary to measure multiple initial portions of the signal, implying pulsed signals. Therefore, the technique of the present invention may be referred to as partial pulse positioning, as it uses a portion of a pulse to determine the position of an object.

Figure 1:
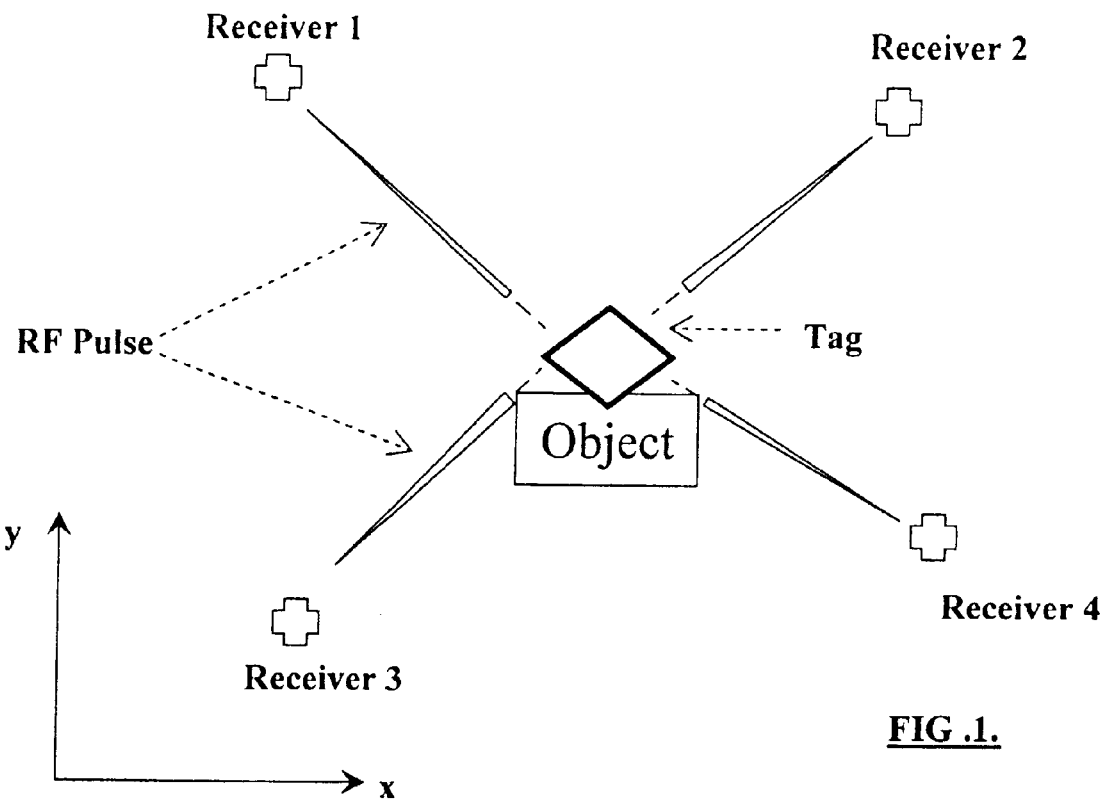
FIG. 1: shows a representation of a factory incorporating the tracking system of the present invention.

Partial pulse positioning preferably employs band-passed RF pulses transmitted or relayed by a transmitter located on or within an object. Referring to FIG. 1, an object which is to have its position determined and/or tracked is referenced 1. The object 1 has a transmitter tag (not shown) mounted on it, which emits a band-passed RF pulse at a predetermined frequency. The RF pulse is observed, pre-conditioned and recorded at spatially separated receivers 2 located around the search volume. For any given receiver 2 pair, the difference between the time of arrival of the pulse at each receiver 2 is proportional to the difference in the range from the tag to the receivers 2 and constrains the tag to lie on a hyperbolic surface of position (SOP). By combining the SOP from three or more independent receiver 2 pairs it is possible to determine the tag position in three dimensions. If prior knowledge such as the tag height is available, only two independent receiver 2 pairs are necessary and in some cases, the combination of a prior model and one SOP may still provide useful estimates. These concepts are common to all time delay based position estimation methods and thus will not be detailed herein. Also, subsequent position estimation from time difference of arrival information is well documented in the literature and well known to those skilled in the art.

Figure 2:
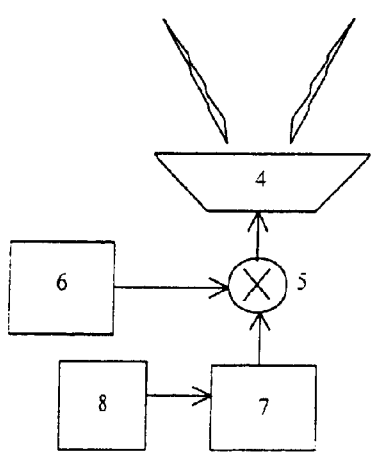
FIG. 2: shows a block diagram representation of a tag for transmitting an identifiable signal.

FIG. 2 illustrates one example of a preferred form of a transmitter tag for use in the present invention. The tag includes a transmit antenna 4 suitable for transmitting RF pulses and a mixer 5 to form the RF signal from a carrier generated by a carrier signal generator 6 and a pulse signal generated by a pulse generator 7. A pulse trigger 8 controls the timing and duration of the pulsed signals. The transmitted signal may include an information stream, for example, to aid in the identification of the tag or the object to which it is attached or to indicate the status of the tag, the object to which it is attached, or the environment in which it is located. It will be appreciated by those skilled in the art that any measurable pulsed signal may be transmitted by the tag, the transmission of an electromagnetic signal, in particular a RF pulse being preferred.

There are many forms in which the tag could be implemented depending on the requirements of the system and/or of the object to be tracked. A low cost, small tag that can be mounted on work in progress during production in a factory is one example. This tag could be removed prior to shipping for re-use or permanently built into the product and thereby essentially 'discarded' once production is complete. The second form is a larger (and possibly higher unit cost) unit that could be mounted on Automated Guided Vehicles (AGV) or other items of greater value.

A power source (not shown) may be co-located with the transmitter or external to the tag to supply power to the active components of the tag. Increased power improves position estimate accuracy by increasing the observed Signal to Noise Ratio (SNR), thus reducing the occurrence and magnitude of position estimation errors due to non-multipath interfering signals. The characteristics that dictate 'onboard' power sources are the expected life of the tag, the required cost as well as the physical application.

The requirements for a coin size tag will typically be more exacting that those of an AGV, as the power supply is constrained due to the size of the tag or object 1, limiting the energy of transmitted signals. Furthermore, a tag may be attached to only one of many small objects located in a single area. It is possible to power the tag externally using emerging Inductive Power Transfer (IPT) technologies or by connecting it to the onboard power supply of the 'host'.

The transmit antenna 4 preferably has a radiation pattern that maximises pulse energy in the direction of the receiver 2. For example, for ceiling mounted receive antennas 2, the transmit antenna 4 preferably, for obvious reasons, directs the transmitted energy generally upwards and minimises energy transmitted towards the floor. Techniques for achieving this are well known to those skilled in the art.

The receive antennas of receivers 2 may be omni-directional or alternatively receive preferentially in one or more directions. Receivers 2 having directional gain offer many benefits. At one extreme, directional antennas can provide angle-of-arrival information on the transmitter by employing pencil beam antennas as used by radar systems, therefore providing further information for the purposes of establishing or verifying the position of the object 1. One method of providing such direction gain involves physically guiding an antenna having a fixed radiation pattern. An intuitively attractive example of this is the constantly rotating radar antennas seen at most airports. A second method involves electronically steering the beam in the desired direction. Electronic beam steering employs adaptive phased array antennas that are commonly referred to as Smart Antennas.

The ability of an antenna to receive energy preferentially from a certain direction has, besides any available angle-of-arrival information, three further primary benefits for partial pulse positioning. The first is the increased number of transmitters that can use any given time slot. The mechanism for providing this benefit is referred to as Space Division Multiple Access (SDMA) and is one of the key tools in efficient resource use in cellular communications. SDMA permits multiple users to co-exist in the same frequency band or time-slot. The antennas are located to minimise the geometric dilution of precision.

The second concerns the received line-of-sight energy. Receivers 2 with higher gain receive antennas will increase the energy of the line-of-sight pulse, directly impacting upon the SNR and accordingly the accuracy and reliability of the partial pulse positioning system.

The third benefit is that the antenna gain pattern can increase the line-of-sight to multipath energy ratio. This is done by ensuring that multipath components fall upon nulls in the radiation pattern. This will have the benefit of increasing the length of the partial pulse and accordingly the integrated SNR of the partial pulse.

Figure 3:
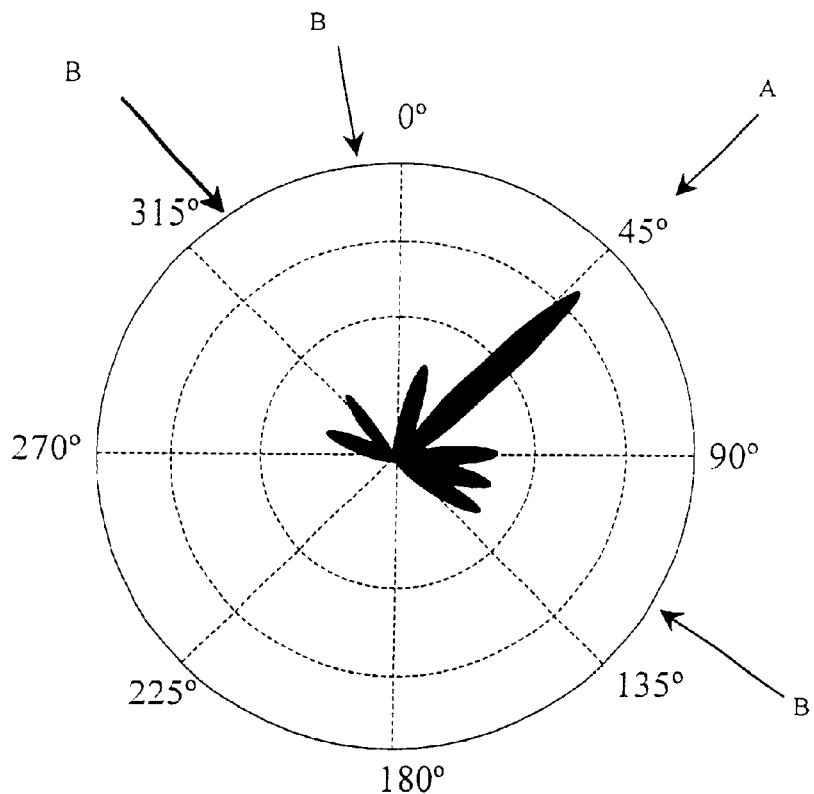
FIG. 3: shows a typical radiation pattern of a receive antenna.

FIG. 3 shows a typical receiver 2 antenna radiation pattern. The line of sight path between the transmit antenna 4 and the receive antenna of the receiver 2 is indicated by arrow A. Three interfering signals in the form of multipath components are indicated by arrows B. In order to maximise the benefit of directional gain, it is preferable that the highest gain direction corresponds to the angle of the line of sight signal. In this case, prior knowledge of the factory may be used to dictate the direction of the receive antenna of each receiver 2. For example, if a component is known to travel along a conveyor belt, this immediately constrains the areas where it is likely to be located and the antenna can be directed towards that area. Furthermore, if the factory geometry is known as well as probable locations of the object 1, then the largest and most likely multipath components may be known. Therefore, each receiver 2 may have a receive antenna which has a null at one or more of these predetermined multipath component angles.

In the preferred embodiment, to allow tracking of multiple tags, time slots are used to differentiate the tags through the use of Time Division Multiple Access (TDMA). Synchronisation of the time slots between tags can be achieved by either ensuring that all tags have accurate clocks on-board or alternatively by providing an externally generated synchronisation or polling message. Such a message can be transmitted using a variety of possible mediums including but not limited to RF, optical and acoustic. Synchronisation approaches are well known and the specific synchronisation approach taken will depend on the application as well as existing and emerging technology.

Alternatively, the tag may simply relay a pulse originating from another source, which may be the same as one or more receivers 2. In this case, the receiver 2 would measure the round trip time of the signal. However, it is preferred that each object generates and transmits its own signal to allow easier identification of individual objects using TDMA.

One method of establishing the difference in the time of arrival of a portion of a signal which does not include multipath components is to use an initial portion of the signal. By using the initial portion of the signal, none or very few interfering multipath components have been received by the antenna. By using the first peak, first zero crossing or any other identifiable feature in the initial portion of the signal as a trigger for each receiver 2, then the time difference of arrival may be computed by calculating the delay between receipt of corresponding triggers at each receiver. This method allows a system which has minimal processing requirements but may be subject to errors due to interfering signals creating false trigger points, particularly background noise signals and signals from sources other than the transmitter on the object 1. These interfering signals are typically present in all portions of the received signal and thus cannot be alleviated by using the initial portion of the received signal.

In order to achieve a more reliable and accurate system, a larger proportion of the received signal may be used as the trigger for each receiver 2. By comparing a larger portion of the signal with an expected received signal more certainty can be achieved that the reference signal is genuine and not due to background noise or other signal transmission sources. However, as portions of the signal further from the initial portion are used, there is an increased probability that there are multipath components in the signal, which can create errors in the determination of the position of an object 1, especially when the signal to noise ratio is low.

Figure 4:
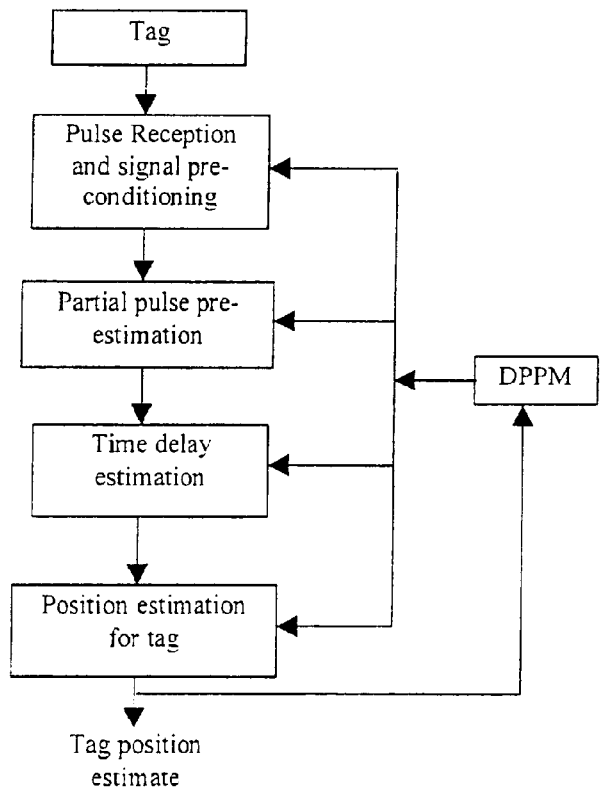
FIG. 4: shows a flow chart of the overall steps involved in position estimation according to one aspect of the present invention.

Therefore, the method and apparatus of the present invention pre-estimates both the onset time of the received pulse and the time of arrival of the first multipath component. The pre-estimation process uses information from a model of the factory and/or objects 1 within the factory and/or signal information to determine these pre-estimates. FIG. 4 shows a flow chart of the overall process for computing the position of an object based on a received pulse signal transmitted from the object 1.

The tag placed on the object 1 transmits the pulsed signal which is received at at least two receivers 2. Partial pulse pre-estimation is then performed to pre-estimate the onset time of the signal received by each receiver 2 and the onset time of the first multipath component, thereby identifying the substantially multipath free component of the received pulse. The pre-estimations are then used to find a best estimate for onset time of the signal at each receiver 2 and the difference between these onset times is the estimated delay between the time of arrival of the two signals. This estimation of the time delay is then used to estimate the position of the tag and thus the position of the object 1.

Figure 5:
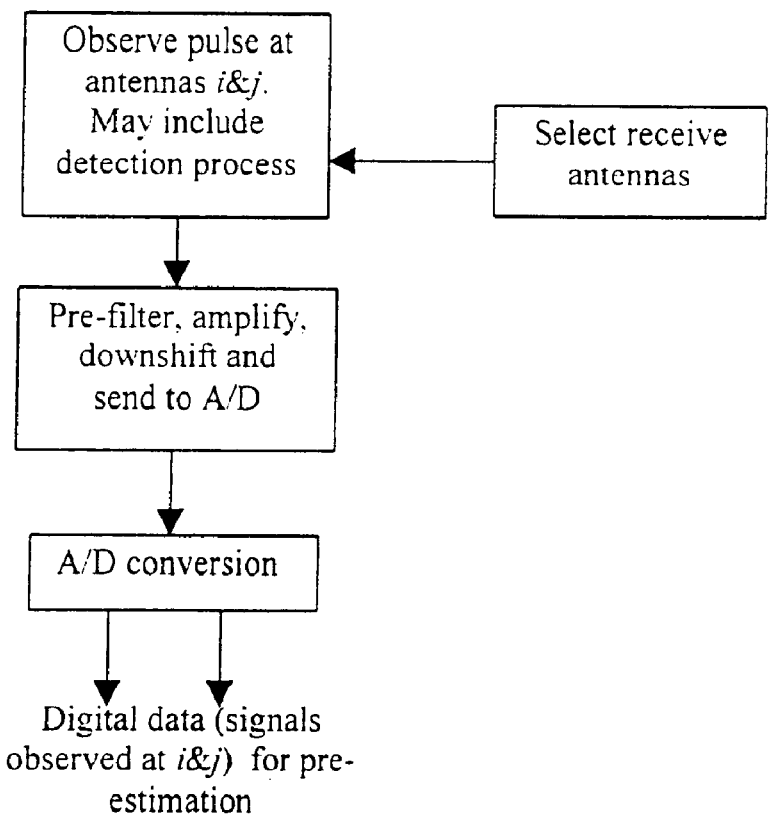
FIG. 5: shows a flow chart of the the signal preconditioning process.
Figure 7:
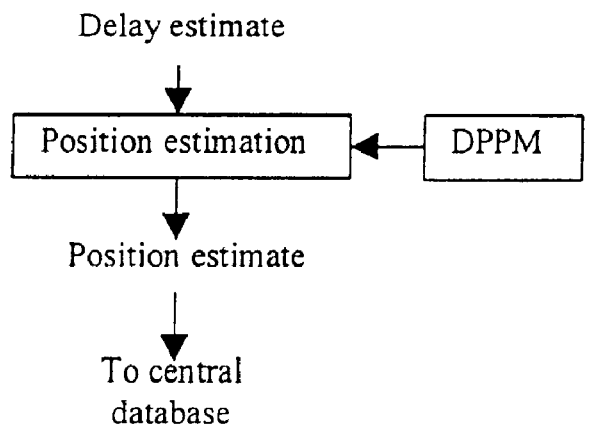
FIG. 7: shows a flow chart of the position estimation process from the delay estimate.
Figure 8:
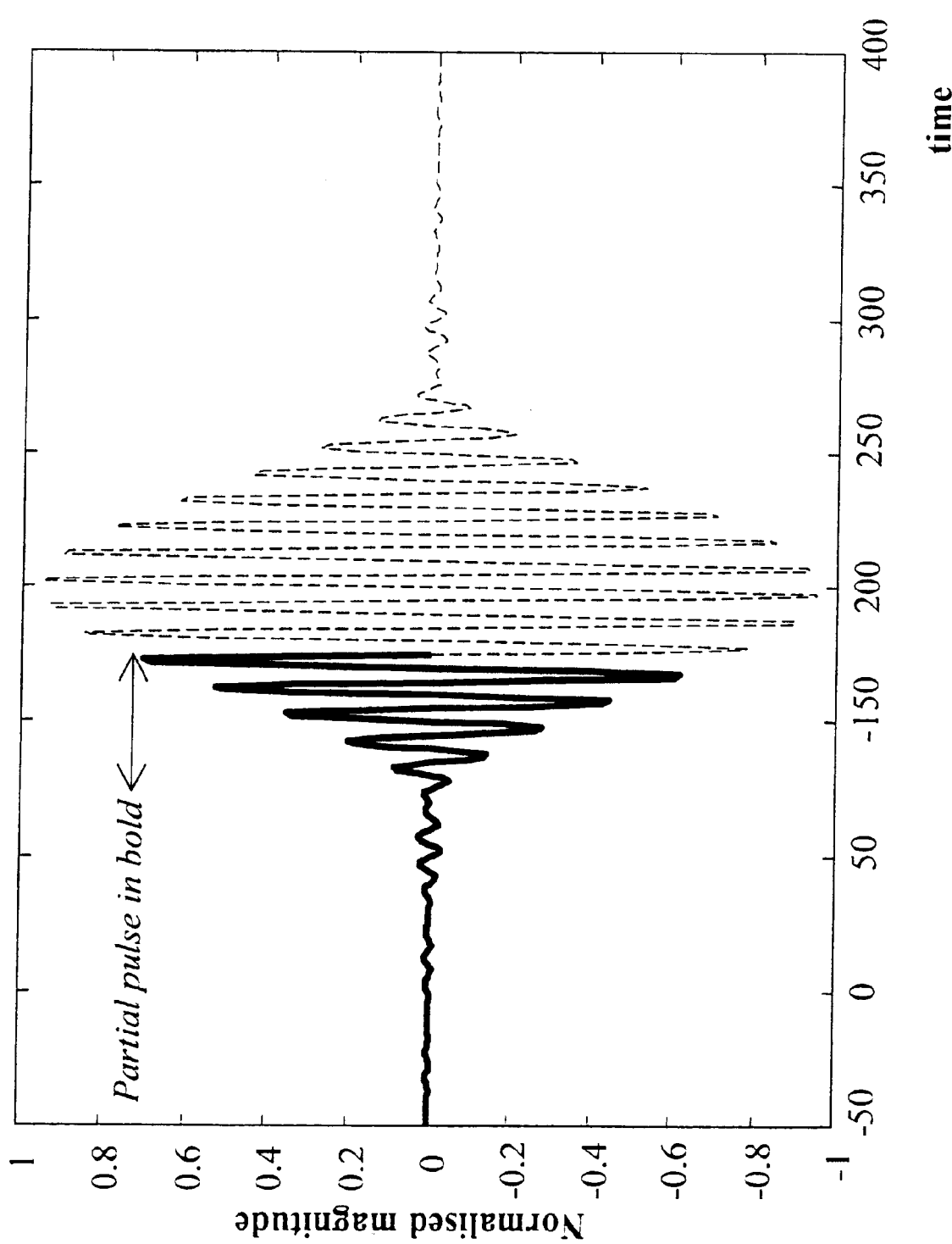
FIG. 8: shows a normalised RF pulse transmitted from the object and received by the receiver.

Each step of the system process will now be described in more detail. The tag first transmits an RF pulse to be received by at least two receivers 2. The pulse may be of any shape, with FIG. 8 showing a preferred pulse in the form of a raised cosine RF pulse. Referring now to FIG. 5, the pulse is observed at at least two receivers 2. The following description is given in reference to calculating the position of an object 1 based on a signal received at two receivers 2. It will be appreciated by those skilled in the art that the process can be repeated for three or more spatially independent, non-colinear receiver pairs to determine the position of an object 1 in three-dimensional space.

To enable a digital processor to analyse the signals, the received signal is converted into digital form. An analogue-to-digital receiver may be used to carry out this task. However, the inclusion of analogue-to-digital receivers in each unit comes at a high cost due to duplication of equipment. To overcome this, the partial pulse positioning system examines antenna pairs sequentially, effectively employing a time division multiple access strategy and therefore requiring only two analogue-to-digital receivers for each antenna "cluster". A multiplexer is used to cycle through the receivers 2 in a predetermined cycle or in a manner as defined by a prior model of the required multiplexing operation. A suitable time synchronisation between the two analogue-to-digital receivers is provided. Of course, the accuracy of the synchronisation will be dependent on the accuracy requirements of the partial pulse positioning system.

Antennas are co-located with signal conditioning equipment, for example a low pass filter and amplifier. The resulting amplified and filtered pulse is communicated to the analogue-to-digital receiver through the multiplexer and a suitable transmission medium, for example a co-axial cable. The selection of the pairs of receivers 2 over time is influenced by a dynamic prior probability model. For example, specific areas of the factory may have more stringent tracking requirements than others, requiring that antennas directed towards that location are sampled more often.

To increase the sampling rate, each antenna of each receiver may be switched between multiple analogue to digital converters. A prior model, as part of the dynamic prior probability model of the sampling requirements of each object, or area(s) within the volume may be used to dictate which antennas are sampled at which rate.

The dynamic prior probability model dictates receiver selection according to the requirements of the system and the available system resources. In a preferred embodiment, the model may define a tuning process, whereby the system resources are varied depending on the characteristics of the factory, object 1, and any restrictions in place. Suitable system resources may include the sampling rate and frequency, bandwidth of the transmitted signal, the radiation pattern and orientation of receiving antennas, the transmission power and the sampling frequency.

The result of the multiplexing operation is that for any given pulse transmission, only two times series need to be recorded for position estimation. The remaining estimation on the tag position must come from another source, for example other antenna clusters, previous delay estimates from spatially independent antennas or any other prior knowledge. Should higher accuracy be required, additional analogue-to-digital receivers can be connected to a cluster.

Figure 6:
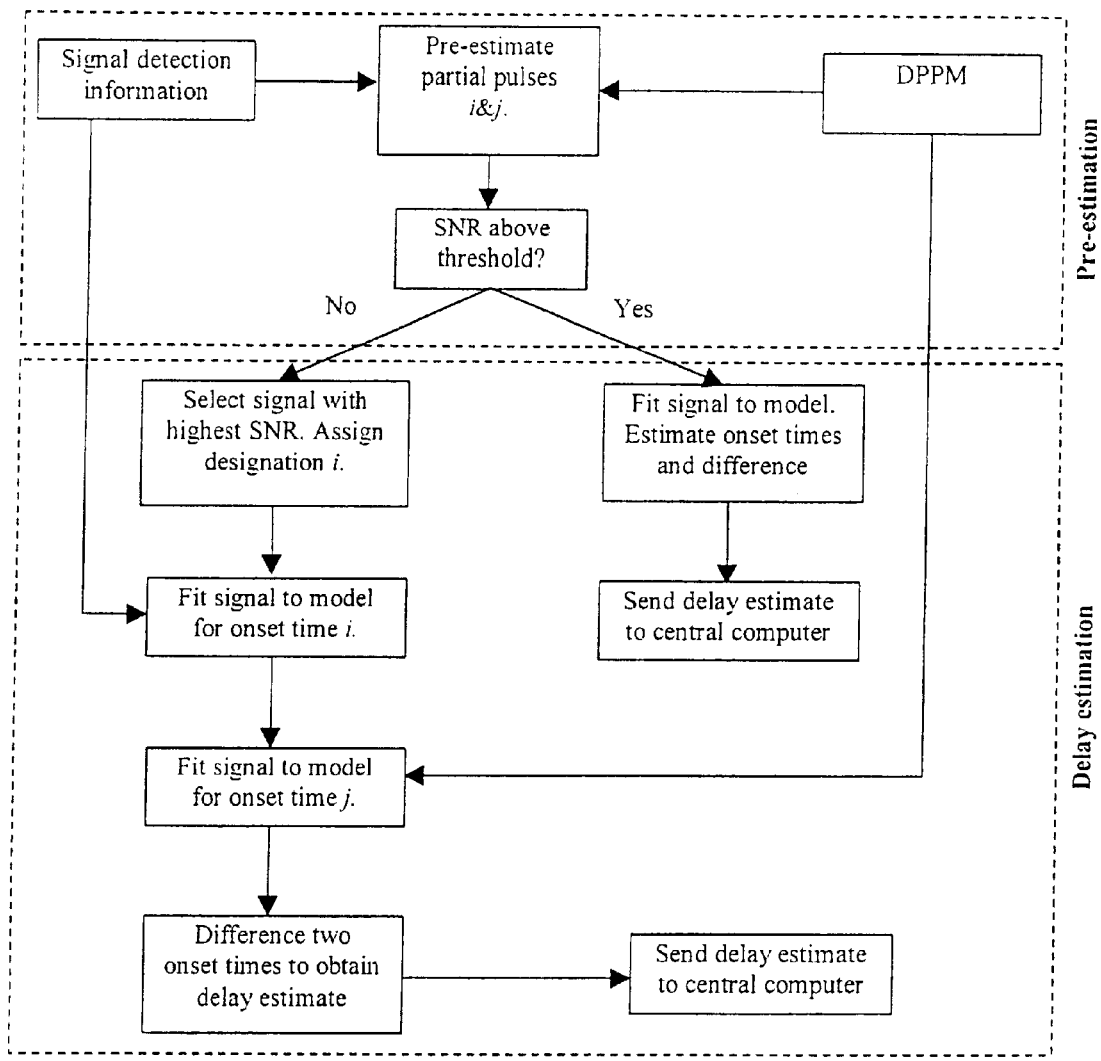
FIG. 6: shows a flow chart of the pre-estimation and delay estimation processes.

Referring now to FIG. 6, a flow chart of the steps involved in pre-estimation and delay estimation are shown. The pre-estimation process uses a signal detection means and information contained in the dynamic prior probability model to estimate the onset time of the received pulse and the onset time of the first multipath component for each received signal. The onset time of the pulse is pre-estimated by detecting a singular characteristic of the received signal. Detecting the characteristic may involve one or more amplitude threshold tests, peak or zero crossing detection, or any other technique from the field of statistical hypothesis testing suitable for detecting a trigger portion of the substantially multipath free component of the received signal.

An initial estimation of the onset time of the signal can be computed from the time of detection of the trigger portion and the expected time difference between the actual onset time and the measured trigger portion, assuming the absence of interfering signals.

Determining the onset time of the first multipath component requires information from the dynamic prior probability model, which may include antenna characteristics, the propagation characteristics of the received transmission frequency and factory geometry. Alternatively, signal characteristics may be analysed either in combination with the model or alone to determine the onset time of the first multipath component. For example, the phase of the received signal may be analysed for changes identifying the onset of multipath components. The directional gain of the antenna may block out some multipath components, allowing a longer portion of a pulse to be used. The wavelength of the transmitted frequency may have an effect on the onset time of the first multipath component. Physical characteristics of the factory geometry such as the location of walls and materials within the factory and expected movements of the object 1 and any other objects may also be included. This information and any further appropriate information is used to establish a pre-estimate of the onset time of the first multipath component given the pre-estimate of the onset time of the received signal. The portion of the received signal up until the pre-estimated onset time of the first multipath component is represented by the continuous (non-dashed) section of the signal in FIG. 8.

Figure 9:
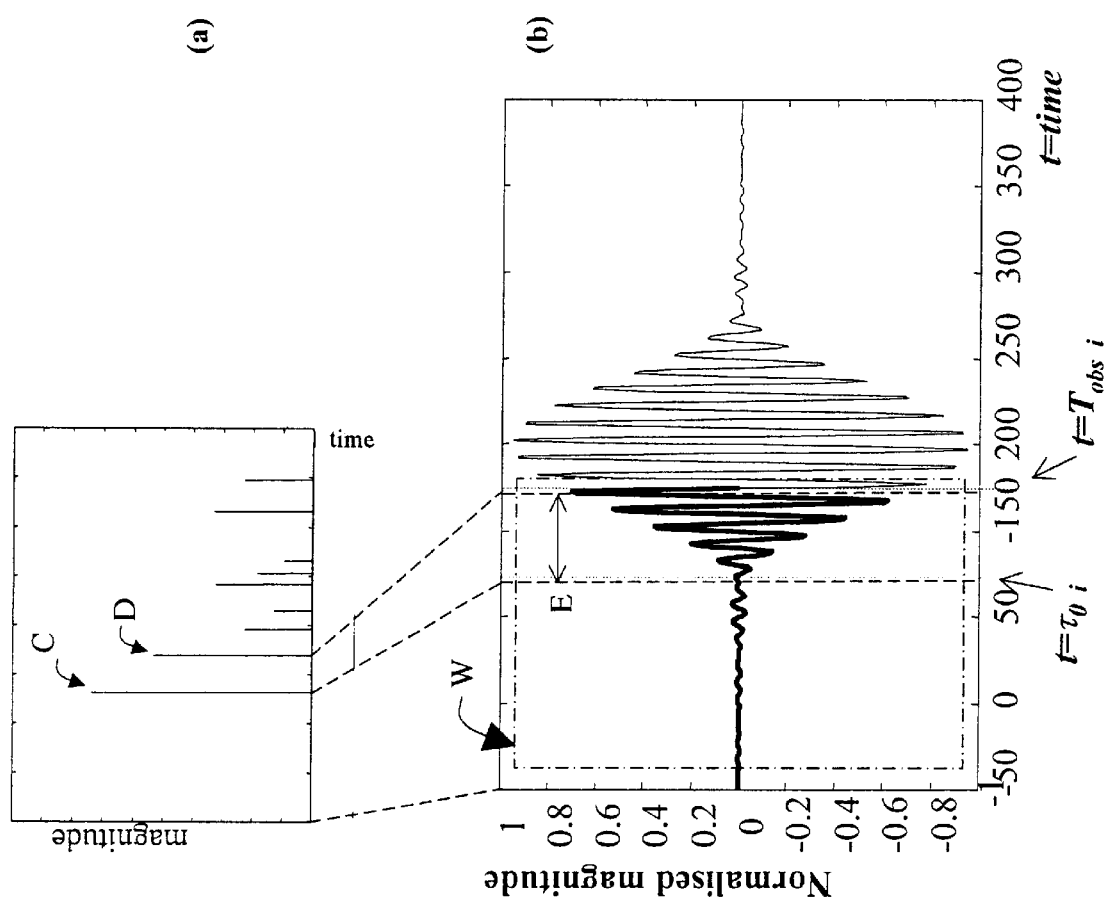
FIG. 9A: shows a typical discrete impulse response of a communication channel between an object and a receiver.
FIG. 9B: shows a normalised partial pulse and its time relationship with the impulse response of FIG. 9A.

Now referring to FIG. 9A, a typical discrete impulse response for the transmission channel between the tag on the object 1 and a receiver 2 is shown. The line of sight component is represented by arrow C and the first multipath component by arrow D. The portion of the pulse used for establishing the time difference of arrival of the signals between receivers is shown by arrow E.

FIG. 9B shows a representation of the line of sight signal observed at a receiver 2. The effect of multipath components are not shown in FIG. 9B. The time of arrival or onset time of the pulse in the window is defined as $t=\tau_{0i}$. The arrival time of the first multipath component is defined as $t=T_{obs\ i}$. Of interest for further analysis is the section of the time series between the arrival time of the line-of-sight component at time $t=\tau_{0i}$ and the arrival time of the first multipath component at time $t=T_{obs\ i}$. By box car windowing the signal in time over the interval $(0,T_{obs\ i})$, all multipath energy as well as some line-of-sight energy is eliminated. The box car window data is highlighted in bold in FIG. 9B.

In reality the impulse response for each antenna will be unknown and therefore the onset time of the pulse and first multipath component have to be pre-estimated using the method described herein above.

Referring again to FIG. 6, the system after pre-estimation the onset time of the pulse and first multipath component then detects the signal to noise ratio of the received signal is above or below a certain threshold. This threshold is selected according to the signal to noise ratio which gives a certain percentage error rate. If the signal to noise ratio is above the threshold, the received signal at each antenna is fitted to a signal model. This signal model is the expected received signal without interference from noise, multipath signals, or other sources of interference. The signal model may be a parametric model. A best fit model is computed for the received signal, for example by performing a least squares error computation. It will be appreciated by those skilled in the art that any error minimisation technique (or equivalently probability maximisation technique) may be used for this purpose. Once the best fit model is found, the onset time of the pulse according to that model is also known for each receives.

For signals received having a signal to noise ratio below the threshold, the resulting computations become dominated by cycle errors. The cycle errors can however be eliminated if there is sufficient a priori knowledge of the true delay. The system selects a signal, signal i, which is preferably the signal with the highest signal to noise ratio and determines the onset time for that signal using the process for signals with a signal to noise ratio above the threshold. Information from the prior probability model is used to formulate an a priori probability density function of the onset time of the remaining signal j.

Figure 10:
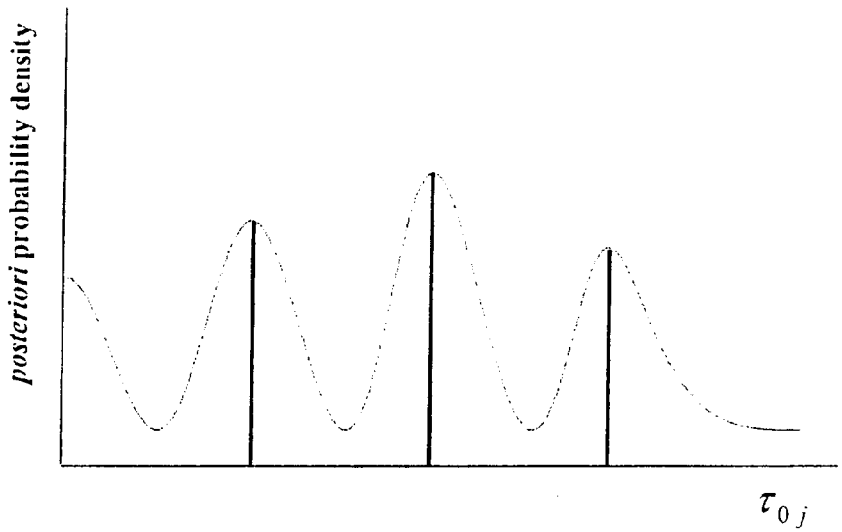
FIG. 10: shows the continuous and discretised probability density of signal onset times resulting from a signal with low signal to noise ratio.
Figure 11:
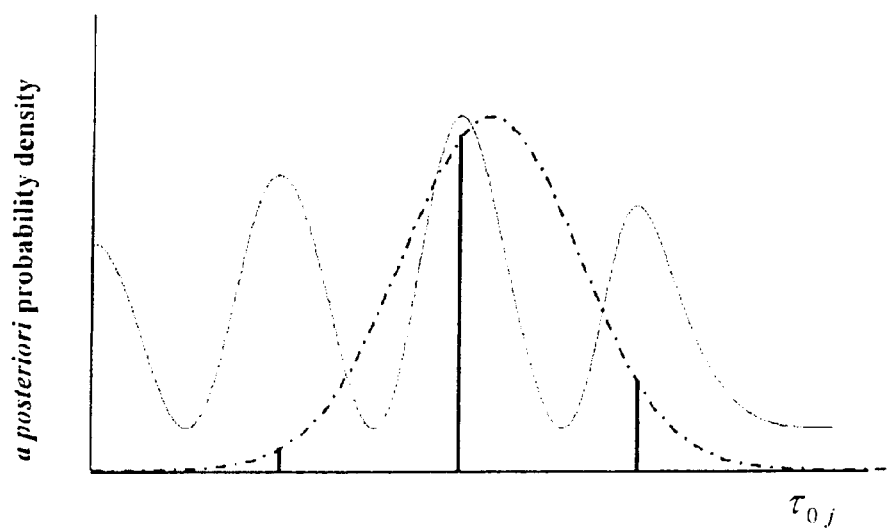
FIG. 11: shows the probability density of signal onset times resulting from a signal with low signal to noise ratio when viewed in light of an a priori probability model.
Figure 12:
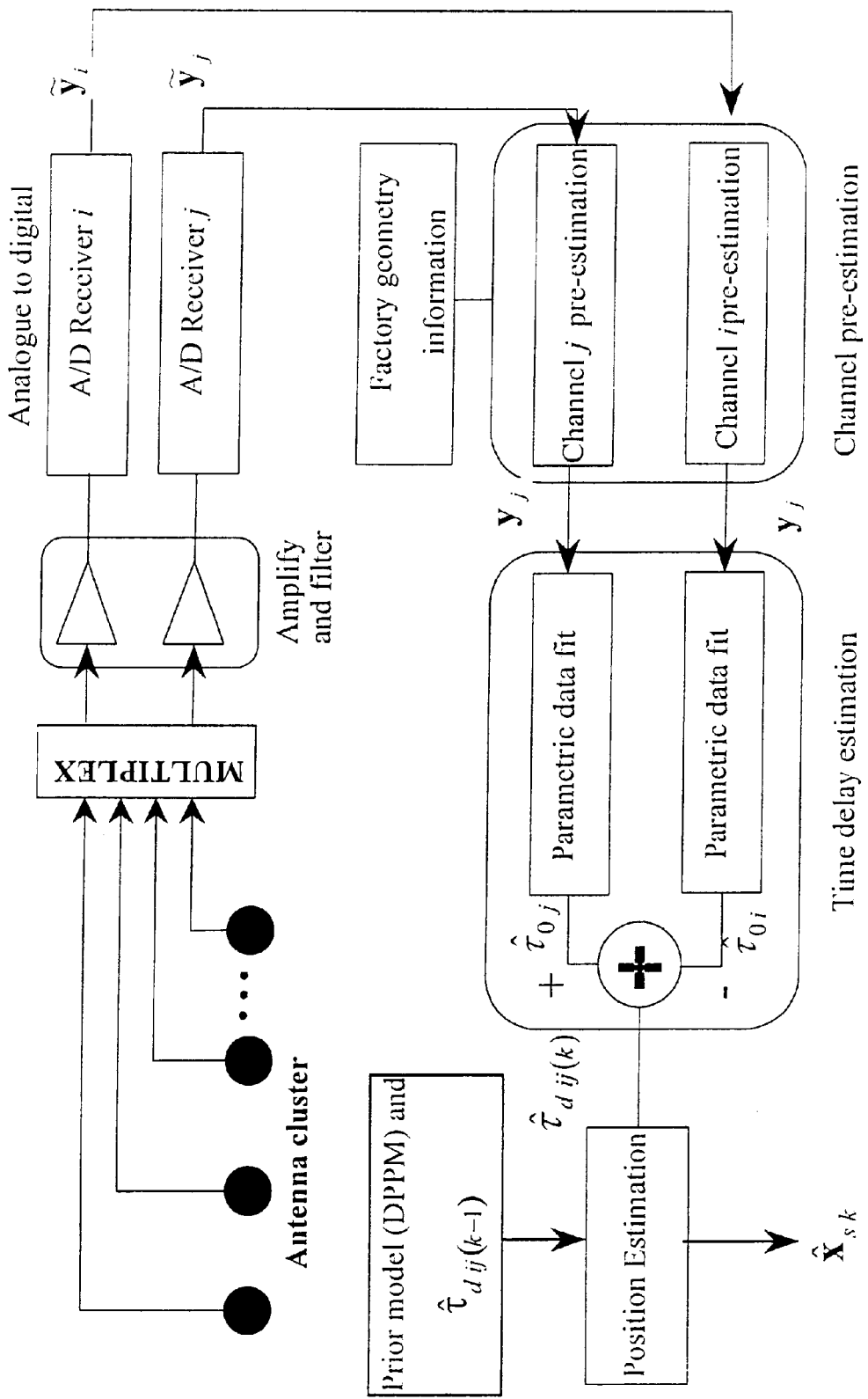
FIG. 12: shows an example of the overall process illustrating the components involved.

This information may be used in combination with the estimated onset time computed for signal i to determine the onset time of signal j. As the signal is periodic, the error function or probability function for the onset time given the received signal is also cyclic. This probability function, which is the probability of the onset time conditional on the received data is defined as the conditional density function. This is represented in FIG. 10. By multiplying the conditional probability density function with the a priori probability density function a posterior density function results. The correct maximum of the posterior density function gives the onset time of the received signal. Thus, the onset time of signal j is then determined and the difference between the estimated arrival times can be computed. To avoid unnecessary biasing due to the a priori density function, the conditional probability density is discretised before multiplying. It will be appreciated to those skilled in the art that substantially equivalent computations may be performed using the techniques of regression analysis rather than probability analysis.

In addition, the system may become susceptible to errors due to fitting the best fit model to the incorrect integer cycle of the signal. This problem is overcome through the use of the prior probability model, which selects the correct integer cycle according the probability of its occurrence. The probability model may be given more weight in the case of low signal to noise ratio than if the signal has a high signal to noise ratio.

The delay estimate is computed as the time difference of arrival of the estimated onset times of the best fit models and is sent to a central computer for position estimation processing. It will be appreciated by those skilled in the art, that the central computer may be replaced with any suitable computing means located anywhere.

Information from the model of the factory or object 1 is used to verify the position calculation and/or to correct minor errors in the position estimation. For example, it is known that objects travel along a conveyor belt, and the position estimation system computes the position of the object to be just off the conveyor, prior knowledge may correct the position to place it on the conveyor. Of course, further information in the model may provide that if an object remains stationary, then it may in fact not be on the conveyor. There are many possibilities of circumstances in which the prior model could be used to determine the actual position of the object from the position estimation. The position estimate is then sent to a central database where it may be retrieved when required. The previous position estimates computed for an object may be included in the dynamic prior probability model for future calculations.

FIG. 8 shows a block diagram representation of the architecture of the system of the present invention according to one embodiment. In the system shown in FIG. 8, the use of pre-estimation of the onset time of the pulse and first multipath component is used. Where the system uses only a singular trigger point, or a number or trigger points, which may for example be averaged, the pre-estimation of the onset time of the pulse would be the actual estimation of the onset time and would be used for the delay calculation.

A cluster of receivers 2 are multiplexed through a multiplexer 9 to two analogue-to-digital converters 10. The signals are conditioned by an amplifier 11 prior to receipt by the analogue-to-digital receiver if required. This creates two data streams $\tilde{y}_i$ and $\tilde{Y}_j$ which are used for pre-estimation, using the dynamic prior probability model (DPPM) and available signal information. The pre-estimation process identifies the relevant portion of the signals $\tilde{y}_i$ and $\tilde{y}_j$ to compute $\tilde{y}_i$ and $\tilde{y}_j$. These are fitted to parametric models to obtain the estimate of the onset time of the pulses. While the pre-estimation and model fitting steps are represented separately in the block diagram of FIG. 8, they may be performed by a single computation means. The difference between the estimated onset times is then computed and a position estimate is calculated from the delay times and any relevant information from the dynamic prior probability model.

In an ideal environment, for highest accuracy, the receivers 2 should be positioned so that there is always a direct line of sight from the object 1 to the receivers 2. In reality, this may not be possible, especially where a number of large objects are moving around the factory. If a direct line of sight does not exist, then the signal analysed by the receiver will be the first signal to arrive at the receiver.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the appended claims.

What is claimed is:

1. A position estimation system for locating an object in a given volume, the system including:
   a signal transmission means suitable for use with the object, and adapted to transmit an identifiable signal;
   a plurality of receivers suitable for receiving the identifiable signal, the receivers positioned at predetermined or determinable positions in relation to the given volume;
   signal detection means adapted to determine a time of arrival of substantially corresponding trigger portions of the identifiable signal at least two of the receivers; and
   computation means adapted to determine for each receiver a location in time of a model of the identifiable signal that best fits the actual signal received in a region location in time proximate the trigger portion and compute a position of the object in the given volume from a difference in the location in time of the model between said receivers;

wherein said trigger portions are at least a portion of the identifiable signal received at each receiver, which is wholly or substantially located in time before the onset of multipath signals at the at least two receivers.

2. A position estimation system as claimed in claim 1, wherein the trigger portion is a singular characteristic of the received signal.

3. A position estimation system as claimed in claim 2, wherein the singular characteristic is a predetermined amplitude.

4. A position estimation system as claimed in claim 2, wherein the singular characteristic is a peak of the received signal or a zero crossing of the received signal.

5. A position estimation system as claimed in claim 2, wherein the computation means are adapted to fit the model to a portion of the actual signal received by a receiver, the portion defined by the part of the signal that is substantially located in time before the arrival of multipath components at said receiver.

6. A position estimation system as claimed in claim 1, further comprising a storage means adapted to store at least one of a predetermined model of the object and the given volume;

wherein the computation means are adapted to determine a pre-estimate of the onset time of the first multipath component from the predetermined model.

7. A position estimation system as claimed in claim 6, wherein the computation means determines the pre-estimate of the onset time of the first multipath component by adding a time period after a pre-estimated first onset time of the identifiable signal, said time period determined from said predetermined model.

8. A position estimation system as claimed in claim 6, wherein the predetermined model includes spatial information on the given volume and/or objects with in the given volume.

9. A position estimation system as claimed in claim 6, wherein the predetermined model includes propagation characteristics of the received signal.

10. A position estimation system as claimed claim 6, wherein the predetermined model includes information on the directional gain of the receiving antenna.

11. A position estimation system as claimed in claim 6, wherein the predetermined model includes a last computed position of the object.

12. A position estimation system as claimed claim 11, wherein the model includes information on the last known position of the object.

13. A position estimation system as claimed in claim 6, wherein if the position is computed from signals received by two or less receiver pairs, the system determines the position of the object in three dimensions from information in the predetermined model of the given volume and characteristics of the object.

14. A position estimation system as claimed in claim 6, wherein the computation means are adapted to pre-estimate the on-set time of the received signal at each receiver from a predetermined model, wherein the predetermined model includes the timing of the transmitted signal from the signal transmission means and at least an estimation of the location of the object.

15. A position estimation system as claimed in claim 14, wherein the model includes information on specific times that the object is expected to be in specific locations.

16. A position estimation system as claimed in claim 1, further comprising means for testing the signal to noise ratio of the received signal at each receiver.

17. A position estimation system as claimed in claim 16, wherein the computation means are adapted to select between different computation algorithms to compute the difference in the time of arrival of the received signals dependent on the signal to noise ratio.

18. A position estimation system as claimed in claim 17, wherein if the signal to noise ratio of the received signals is above a certain threshold, the computing means is adapted to compute a best fit signal model to each received signal, wherein the delay estimate is thereby computed by identifying the delay between the best fit signal model of at least two received signals.

19. A position estimation system as claimed in claim 18, wherein:

the identifiable signal has a periodic component; and the a priori probability of a delay resulting from a specific onset time at each receiver in a receiver pair is weighted according to a probability of the number of periods of the identifiable signal elapsing between the onset time of a line of sight component at one receiver and the onset time of the line of sight component at the other receiver of the receiver pair, the probability of the number of periods of the periodic signal elapsing determined from at least one of a predetermined model of the position estimation system and the last known location of an object.

20. A position estimation system as claimed in claim 17, wherein if the signal to noise ratio of a received signal is below a predetermined threshold, the computing means is adapted to select the signal with the highest signal to noise ratio and compute a best fit signal model to that signal, wherein the best fit signal model for the signal or signals having a signal to noise ratio below the threshold is computed or selected according to the highest probability of the resulting computed delay.

21. A position estimation system as claimed in claim 20, wherein the probabilities of specified delays are contained in a predetermined model.

22. A position estimation system as claimed in claim 20, wherein the computing means is adapted to multiply the a priori probability of a delay resulting from a specific onset time at each receiver with a probability of that delay conditional on the received signals and to identify the onset time as the maximum of the resulting product.

23. A position estimation system as claimed claim 1, wherein the computation means determines the difference in the time of arrival of the signals at each receiver by computing the difference between the onset time of the best fit signal model to the received signals.

24. A position estimation system as claimed claim 1, wherein the object is adapted to transmit a pulsed signal at predetermined time intervals.

25. A position estimation system as claimed claim 1, comprising at least two sets of receivers each adapted to receive signals from the given volume and wherein the position estimation system selects a receiver from said at least two sets of receivers based on a multiplexing technique.

26. A position estimation system as claimed in claim 25, wherein the system includes an analogue-to-digital receiver for each set of receivers.

27. A position estimation system as claimed claim 1, comprising at least three sets of receivers each adapted to receive signals from the given volume and wherein the position estimation system selects a receiver from said at least two sets of receivers based on a multiplexing technique.

28. A position estimation system as claimed claim 1, wherein each receiver has a receive antenna with a radiation pattern which receives preferentially in one or more directions and the direction of each receive antenna is determined from expected positions and/or movements of the object to be tracked.

29. A position estimation system as claimed in claim 28, wherein the receivers are located based on the principles of space division multiple access and minimization of the geometric dilution of precision.

30. A position estimation system as claimed in claim 1, wherein movement of the object is tracked by periodically determining the position of the object.

31. A method of determining the position of an object in a given volume, the method including:
   transmitting an identifiable signal from the object to be tracked;
   receiving the transmitted signal at a plurality of receivers positioned at predetermined or determinable positions;
   for at least two of said receivers, identifying a part of the received signal which is wholly or substantially located in time before multipath signals are received at said receivers;
   comparing a portion of the received signal proximate the identified part of the received signal with a model of the received signal and determining the location in time of said model that best fits the received signal; and
   computing the position of the object in the given volume from a difference in the location in time of the models that best fit the received signal.

32. A method of determining the position of an object as claimed in claim 31, wherein said part of the received signal which is wholly or substantially located in time before multipath signals are received is a singular characteristic of the signal.

33. A method of determining the position of an object as claimed in claim 32, wherein the singular characteristic is a predetermined amplitude threshold.

34. A method of determining the position of an object as claimed in claim 33, wherein the singular characteristic is a peak of a transient response or a zero crossing of the received signal.

35. A method of determining the position of an object as claimed in claim 31, wherein the portion of the received signal proximate the identified part of the received signal is determined as the portion of the received signal between a pre-estimate of a first onset time of the identifiable signal and a pre-estimate of the onset time of the first multipath signal.

36. A method o determining the position of an object as claimed in claim 35, wherein the first on-set time of the identifiable signal received by each receiver is pre-estimated from the arrival time of one or more singular characteristics of the received signal.

37. A method of determining the position of an object as claimed in claim 36, wherein the one or more singular characteristics are determined using an amplitude threshold test.

38. A method of determining the position of an object as claimed in claim 37, wherein the singular characteristic is a peak or a zero crossing of the received signal.

39. A method of determining the position of an object as claimed in claim 35, wherein the on-set time of the signal at each receiver is pre-estimated from at least one of a predetermined model of the object and the given volume, wherein the model includes information on the timing of the identifiable signal and at least an estimation of the location of the object.

40. A method of determining the position of an object as claimed in claim 39, wherein the model includes information on specific times that the object is expected to be in specific locations.

41. A method of determining the position of an object as claimed in claim 39, wherein the model includes information on the last known position of the object.

42. A method of determining the position of an object as claimed in claim 31, further including the step of determining a pre-estimate of the onset time of the first multipath signal from at least one of a predetermined model of the object and the given volume.

43. A method of determining the position of an object as claimed in claim 42, wherein the pre-estimate of the onset time of the first multipath component is determined from a delay estimate determined from the predetermined model from a first onset time of the identifiable signal.

44. A method of determining the position of an object as claimed in claim 42, wherein the model includes spatial information relating to the given volume and/or objects within the given volume.

45. A method of determining the position of an object as claimed in claim 42, wherein the predetermined model includes propagation characteristics of the received signal.

46. A method, determining the position of an object as claimed in claim 42, wherein the model includes information on the directional gain of the receiving antenna.

47. A method s determining the position of an object as claimed in claim 42, wherein the model includes the last determined position of the object.

48. A method of determining the position of an object as claimed in claim 31, wherein the method further includes testing the signal to noise ratio of the received signal at each receiver and selecting a predetermined computation algorithm to compute the difference in the time of arrival of the signals dependent on the signal to noise ratio.

49. A method of determining the position of an object as claimed in claim 48, wherein if the received signal is below a predetermined threshold, the method includes selecting the signal with the higher signal to noise ratio and fits a best fit signal model to the other received signals using the best fit signal model of the first signal to confine the best fit signal model of the second and any subsequent signal within predetermined thresholds.

50. A method of determining the position of an object as claimed in claim 49, wherein the method further includes selecting the signal with the highest signal to noise ratio and computing a best fit signal model to that signal and computing or selecting a best fit model for the signals having signal to noise ratios below the threshold based on the probability of the resulting computed delay.

51. A method of determining the position of an object as claimed in claim 50, wherein the probability of specified delays are contained in a predetermined model.

52. A method of determining the position of an object as claimed in claim 50, further comprising selecting a best fit signal model from a plurality of possible solutions dependent on a scaled product of a value indicative of the difference between the received signal with a model signal and a value indicative of the probability of a delay resulting from each said possible solution.

53. A method of determining the position of an object as claimed in claim 50, wherein the identifiable signal is periodic and if the phase angle of the identifiable signal is unknown, then the system determines an expected integer number of periods of the periodic signal from the predetermined model.

54. A method of determining the position of an object as claimed in claim 31, wherein the difference in the time of arrival of the signals at each receiver is determined by computing the difference between the onset time of the best fit signal model of each received signal.

55. A method of determining the position of an object as claimed in claim 31, the method including transmitting a pulsed signal at predetermined time intervals from the object to be tracked.

56. A method of determining the position of an object as claimed in claim 31, further comprising the step of periodically determining the position of an object to track movement of the object.

57. A position estimation system for locating an object that transmits an identifiable signal in a given volume, the system comprising:

a plurality of receivers suitable for receiving an identifiable signal, the receivers positioned at predetermined or determinable positions in relation to a given volume; and signal detection means and computation means operable to:

a) for at least two receivers, determine a part of the identifiable signal received prior to the onset time of multipath components at that receiver;

b) determine the location in time of a model of the identifiable signal that best fits the part of the identifiable signal determined in step a); and c) compute the location of the object in the given volume from a difference in the location in time of the models identified in step b).

58. A position estimation system as identified in claim 57, wherein step a) further comprises:

determining the time of arrival of a trigger portion of the identifiable signal at each receiver; and truncating the received signal based on at least one of:

i) characteristics of the environment in which the position measurement system is to be operated in;

ii) characteristics of the object;

iii) propagation characteristics of the identifiable signal;

iv) characteristics of the identifiable signal received at the receiver;

v) characteristics of each receiver.

\* \* \* \* \*

UNITED STATES PATENT AND TRADEMARK OFFICE
CERTIFICATE OF CORRECTION

PATENT NO. : 6,683,568 B1
DATED : January 27, 2004
INVENTOR(S) : Winton et al.

It is certified that error appears in the above-identified patent and that said Letters Patent is hereby corrected as shown below:

<u>Title Page,</u>
Item [12], Last Name Only, should read -- Winton et al. --.
Item [54], Inventions, should read -- POSITION ESTIMATION SYSTEMS --.
Item [75], Inventors, the name of the first inventor should read -- Paul William James Winton --.

<u>Column 11,</u>
Line 1, change claim "2" to claim -- 1 --.
Line 1, change claim "6" to claim -- 1 --.

<u>Column 13,</u>
Line 1, after the word "method" change "o" to -- of --.

<u>Column 14,</u>
Line 1, after the word "method" add the word -- of --.
Line 1, after the word "method" delete the "s" and add the word -- of --.

Signed and Sealed this

Eighth Day of June, 2004

JON W. DUDAS
*Acting Director of the United States Patent and Trademark Office*